(12) United States Patent  
Czajkowski (10) Patent No.: US 9,904,514 B1  
(45) Date of Patent: Feb. 27, 2018

(54) FUSED FLOATING-POINT ARITHMETIC CIRCUITRY

(71) Applicant: Altera Corporation, San Jose, CA (US)

(72) Inventor: Tomasz Czajkowski, Toronto (CA)

(73) Assignee: Altera Corporation, San Jose, CA (US)

( * ) Notice: Subject to any disclaimer, the term of this patent is extended or adjusted under 35 U.S.C. 154(b) by 120 days.

(21) Appl. No.: 14/876,160

(22) Filed: Oct. 6, 2015

(51) Int. Cl.
*G06F 7/48* (2006.01)
*G06F 7/485* (2006.01)

(52) U.S. Cl.
CPC .................................. *G06F 7/485* (2013.01)

(58) Field of Classification Search
None
See application file for complete search history.

(56) References Cited

U.S. PATENT DOCUMENTS

| | | |
|---|---|---|
| 7,567,997 B2 | 7/2009 | Simkins et al. |
| 8,266,198 B2 | 9/2012 | Lee et al. |
| 8,266,199 B2 | 9/2012 | Langhammer et al. |
| 8,301,681 B1 | 10/2012 | Lee et al. |
| 8,307,023 B1 | 11/2012 | Leung et al. |
| 2012/0290819 A1 | 11/2012 | Langhammer |

OTHER PUBLICATIONS

Langhammer, U.S. Appl. No. 13/752,661, filed Jan. 29, 2013.

*Primary Examiner* — Michael D Yaary
(74) *Attorney, Agent, or Firm* — Jason Tsai (57) ABSTRACT

An integrated circuit may be provided with a specialized processing block that performs floating-point addition and subtraction operations. For this purpose, the specialized processing block includes a fused adder and subtractor stage with an adder circuit and a subtractor circuit. The adder and subtractor circuits share an alignment stage for aligning the mantissas of incoming floating-point numbers and provide a simplified normalization stage with one right shifter and one left shifter. The specialized processing blocks may be arranged in rows or columns such that an input of a first specialized processing block is directly coupled to an output of a second specialized processing block and an input of the second specialized processing block is directly coupled to an output of the first specialized processing block.

20 Claims, 6 Drawing Sheets

FUSED FLOATING-POINT ARITHMETIC CIRCUITRY

BACKGROUND

This relates to performing floating-point arithmetic operations in integrated circuits and, more particularly, to circuitry performing floating-point addition and subtraction.

Floating-point operations are usually implemented in accordance with the IEEE754 standard, which defines a floating-point number as having a sign, a mantissa, and an exponent. According to the IEEE754 standard, the mantissa is required to be normalized at all times because the standard implies a leading "1." However, performing normalization can be expensive in terms of circuit area and operational latency. Some floating-point operations also require that the floating-point number operands be manipulated as part of a floating-point operation. For example, floating-point addition and subtraction require that the mantissas of the floating-point number operands be aligned such that the exponents of the floating-point number operands are equal.

Situations frequently arise where operations require the computation of the sum and the difference of the same two floating-point numbers (e.g. in a Fast Fourier Transform (FFT)). Both of these operations may require the normalization of the mantissas for both floating-point numbers for the addition and for the subtraction.

SUMMARY

According to some embodiments, an integrated circuit may include first and second specialized processing blocks. The first specialized processing block may have a first input that is directly coupled to an output of the second specialized processing block, a first output that is directly coupled to an input of the second specialized processing block, a first arithmetic operator stage, and a second arithmetic operator stage that is coupled to the first arithmetic operator stage, the first input, and the first output. The second arithmetic operator stage may have first and second output ports, and the first specialized processing block may further include a multiplexer.

The multiplexer may have first, second, and third input ports and an output port. The first and second input ports of the multiplexer may be coupled to the first and second output ports of the second arithmetic operator stage, the third input port of the multiplexer may be coupled to the first arithmetic operator stage, and the output port of the multiplexer may be coupled to the first output.

It should be appreciated that the present invention can be implemented in numerous ways, such as a process, an apparatus, a system, a device, or instructions on a computer readable medium. Several inventive embodiments of the present invention are described below.

In certain embodiments, the above-mentioned second specialized processing block may further have a floating-point adder-subtractor circuit that receives first and second floating-point numbers each having an exponent and a mantissa. The floating-point adder-subtractor may compute the sum of the first and second floating-point numbers and the difference between the first and the second floating-point numbers.

If desired, the floating-point adder-subtractor circuit may include an alignment block and an adder circuit. The alignment block may receive the first and second floating-point numbers and produce aligned first and second floating-point numbers having aligned matissas and aligned exponents. The adder circuit that is coupled to the alignment block may produce a sum of the aligned mantissas of the aligned first and second floating-point numbers.

Further features of the present invention, its nature and various advantages, will be more apparent from the accompanying drawings and the following detailed description of the preferred embodiments.

DETAILED DESCRIPTION

This relates to performing floating-point arithmetic operations in integrated circuits and, more particularly, to performing floating-point addition and subtraction.

Floating-point operations are usually implemented in accordance with the IEEE754 standard, which defines a floating-point number as having a sign, a mantissa, and an exponent, and where the mantissa is required to be normalized at all times because the standard implies a leading "1." Furthermore, floating-point addition and subtraction require that the mantissas of the floating-point number operands be aligned in such a way that the exponents of the floating-point number operands are equal in value. Thus, each addition (or subtraction) operation requires the alignment of the floating-point numbers that are to be added (or subtracted). Similarly, normalization of the mantissa produced by a floating-point addition (or subtraction) stage may be required. However, normalization and alignment operations can be expensive in terms of circuit area and operational latency.

Situations frequently arise where floating-point addition and subtraction operations are executed in parallel (e.g., the addition and the subtraction of the same two numbers substantially at the same time). It may be desirable to implement an alignment stage that may be shared between the floating-point addition and subtraction operations. Similarly, the normalization stage after the floating-point addition and subtraction operations may be shared. Thus potential inefficiencies may be removed.

It will be obvious to one skilled in the art, that the present exemplary embodiments may be practiced without some or all of these specific details. In other instances, well-known operations have not been described in detail in order not to unnecessarily obscure the present embodiments.

Figure 1:
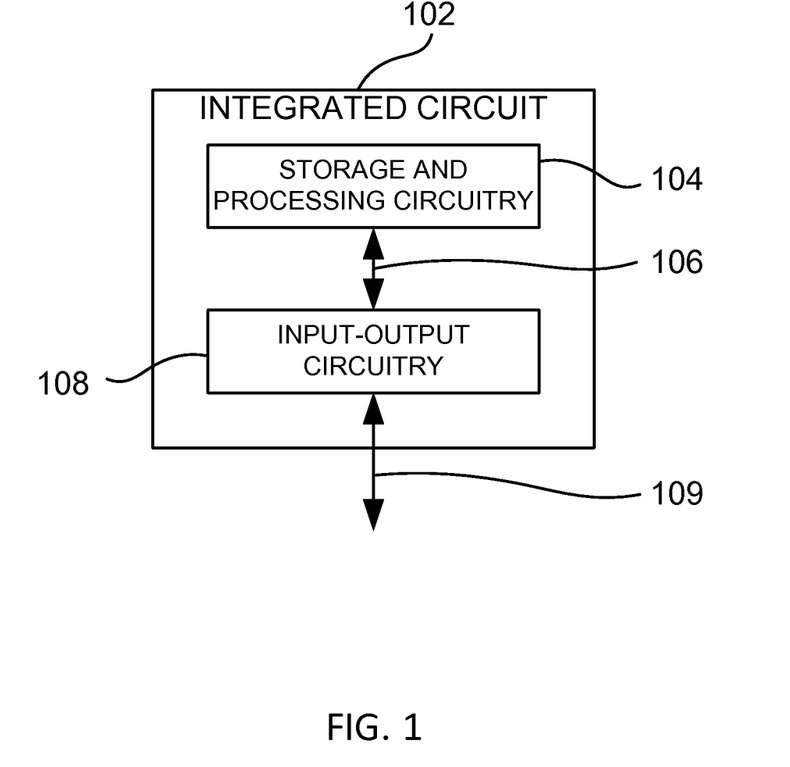
FIG. 1 is a diagram of an illustrative integrated circuit in accordance with an embodiment.

An illustrative embodiment of an integrated circuit 102 is shown in FIG. 1. Integrated circuit 102 may include storage and processing circuitry 104 and input-output circuitry 108. Storage and processing circuitry 104 may include embedded microprocessors, digital signal processors (DSP), microcontrollers, specialized processing blocks, arithmetic processing circuits, or other processing circuitry. The storage and processing circuitry 104 may further have random-access memory (RAM), first-in first-out (FIFO) circuitry, stack or last-in first-out (LIFO) circuitry, read-only memory (ROM), content-addressable memory (CAM), or other memory elements. Input/output circuitry may include parallel input/output circuitry, differential input/output circuitry, serial data transceiver circuitry, or other input/output circuitry suitable to transmit and receive data. Internal interconnection resources 106 such as conductive lines and busses may be used to send data from one component to another component or to broadcast data from one component to one or more other components. Internal interconnection resources 106 may also include network-on-chip (NoC) or other on chip interconnection resources. External interconnection resources 109 such as conductive lines and busses, optical interconnect infrastructure, or wired and wireless networks with optional intermediate switches may be used to communicate with other devices.

Floating-point numbers are commonplace for representing real numbers in scientific notation in computing systems and are designed to cover a large numeric range and diverse precision requirements. The IEEE754 standard is commonly used for floating-point numbers. A floating-point number, such as the floating-point number illustrated in FIG. 2, includes three different parts: the sign of the floating-point number 210, the mantissa 220, and the exponent 230. Each of these parts may be represented by a binary number and, in the IEEE754 format, has different bit sizes depending on the precision. For example, a single precision floating-point number such as the floating-point number in FIG. 2 requires 32 bits, which are distributed as follows: one sign bit (bit 31), eight exponent bits (bits [30:23]), and 23 mantissa bits (bits [22:0]). A double precision floating-point number requires 64 bits including one sign bit (bit 63), 11 exponent bits (bits [62:52]), and 52 mantissa bits (bits [51:0]).

Figure 2:
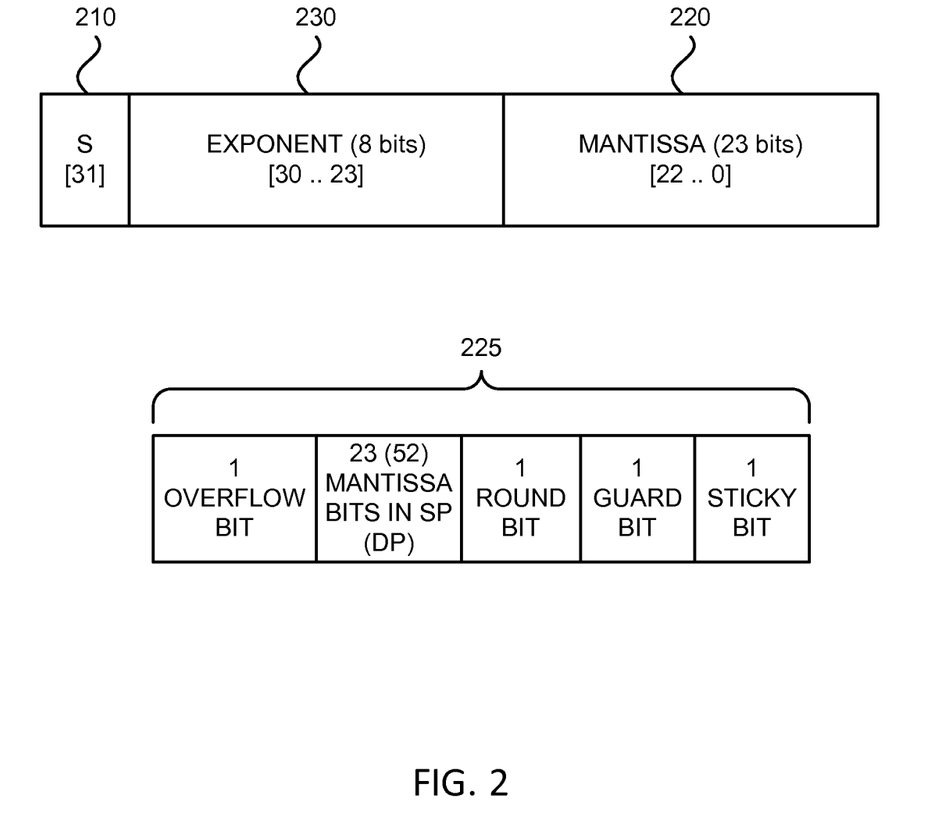
FIG. 2 is a diagram of an illustrative single precision floating-point number and an extended mantissa produced by dynamic bit extension in accordance with an embodiment.

According to the IEEE754 standard, a mantissa may also have additional bits. A mantissa that has additional bits is sometimes also referred to as an extended mantissa 225. For example, an extended, single precision mantissa may have four additional bits (i.e., an extended, single precision mantissa may include 27 bits instead of 23 bits, while an extended, double precision mantissa may include 56 bits instead of 52 bits). The last three bits added to the right of the least significant bit represent round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, round and guard bits enable the representation of numbers that are smaller than a mantissa without these additional bits may be able to represent accurately. The sticky bit may record any bits of value '1' that are shifted beyond the precision of the mantissa by performing a logical OR operation with the round and guard bits.

The remaining bit is added beyond the most significant bit position and may absorb any overflow produced by a floating-point arithmetic operation.

The sign of a floating-point number according to standard IEEE754 is represented using a single bit, where a "0" denotes a positive number and a "1" denotes a negative number.

The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is −127. For example a value of 140 for the exponent actually represents (140−127)=13, and a value of 100 represents (100−127)=−27. For double precision numbers, the exponent bias preferably is −1023.

As discussed above, according to the IEEE754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

Figure 3:
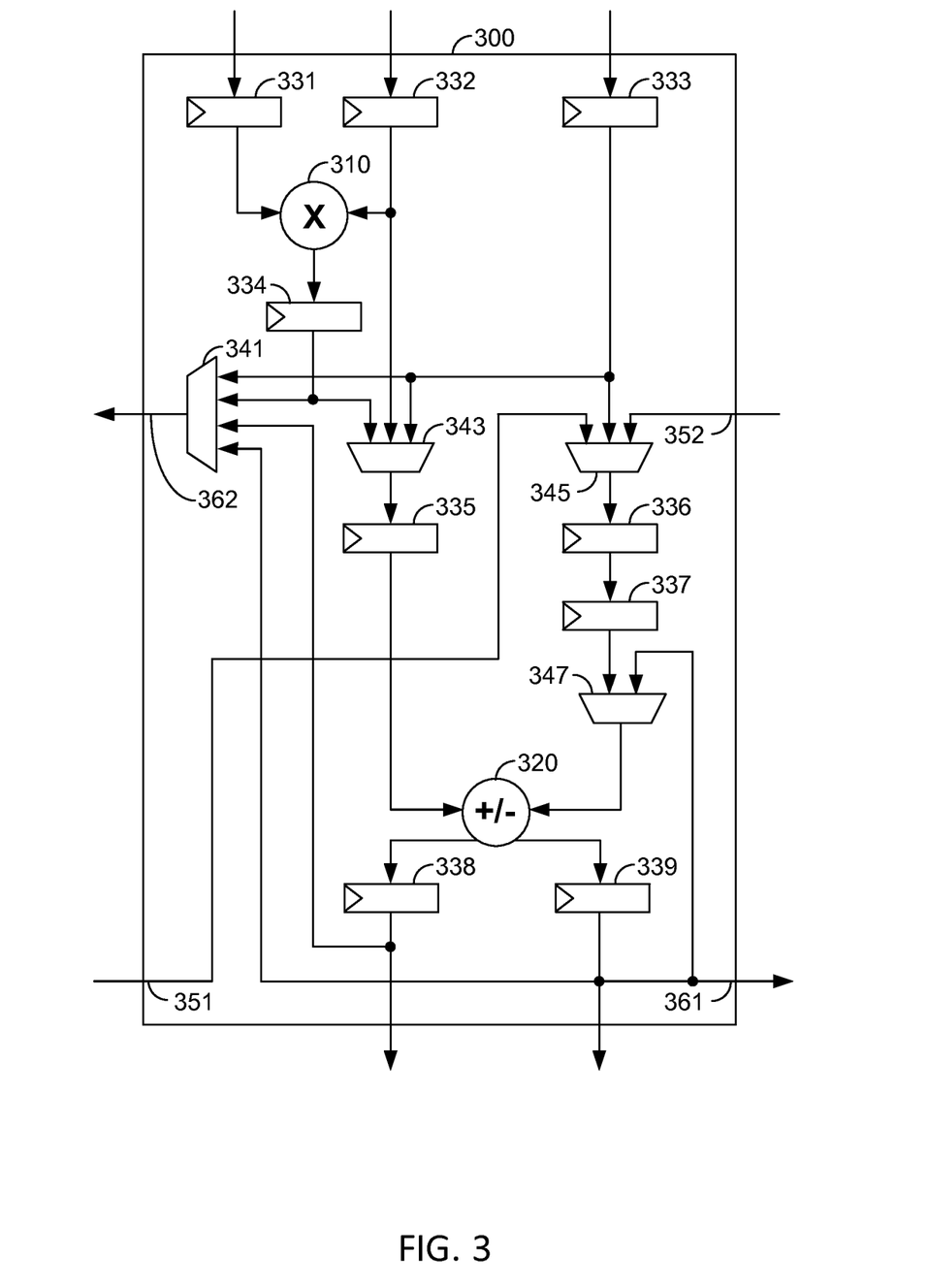
FIG. 3 is a diagram of an illustrative specialized processing block in accordance with an embodiment.

FIG. 3 shows a diagram of an exemplary specialized processing block 300 according to an embodiment. As shown, specialized processing block 300 may include multiplier stage 310, adder and subtractor stage 320, registers 331-339, and multiplexers 341, 343, 345, and 347.

Specialized processing block 300 may have inputs coupled to external interconnect resources. Specialized processing block 300 may also have inputs 351 and 352 that are directly coupled to an adjacent specialized processing block 300. Similarly, specialized processing block 300 may have outputs coupled to external interconnect resources and outputs 361 and 362 that are directly coupled to another adjacent similar specialized processing block 300. Except at the ends of a chain of specialized processing blocks 300, there are direct connections between input 351 and output 361 and between input 352 and output 362 of each pair of adjacent specialized processing blocks 300.

As shown, FIG. 3 represents a logical diagram of an exemplary specialized processing block 300. In this logical representation, implementation details, such as registers and some programmable routing features—such as multiplexers that may allow the output of a particular structure to be routed directly out of specialized block 300—are omitted to simplify discussion. In addition, some elements that are shown may, in an actual embodiment, be implemented more than once. For example, the multiplier 310 may actually represent two or more multipliers, as in the specialized processing blocks of the STRATIX® and ARRIA® families of programmable logic devices or "PLDs" sold by Altera Corporation of San Jose, Calif.

In the logical representation of FIG. 3, the adder and subtractor stage 320 follows a multiplier stage 310. The multiplier stage 310 may implement a fixed-point multiplier or a floating-point multiplier. A floating-point multiplier may be constructed from a 27×27 fixed-point multiplier and some additional logic. The additional logic may calculate exponents, as well as special and error conditions such as NAN (not-a-number), Zero and Infinity. Optionally, other logic may be provided to round the result of the multiplier to IEEE754 format. Such rounding can be implemented as part of the final adder within the multiplier structure (not shown), or in programmable logic outside the specialized processing block 300 when the output of the multiplier 310 is outputted directly from the specialized processing block 300.

The multiplier stage 310 may feed the adder and subtractor stage 320 directly in a multiplier-add (MADD) mode.

The adder and subtractor stage 320 may implement a fixed-point adder and subtractor or a floating-point adder and subtractor.

As discussed above, IEEE754-compliant rounding may be provided inside embodiments of specialized processing block 300, or may be implemented using resources outside of specialized processing block 300. For example, if the specialized processing block is integrated in a programmable logic device (PLD), rounding may be implemented using the general-purpose programmable logic portion of the device. The rounding may be implemented with a single level of logic, which may be as simple as a carry-propagate adder, followed by a register. Assuming, as is frequently the case, that all of the outputs of the specialized processing blocks must be rounded, there would be no disturbance or rebalancing of the data path required.

Another feature that may be implemented in specialized processing block 300 is the calculation of an overflow condition of the rounded value, which may be determined using substantially fewer resources than the addition operation. Additional features that may be included in specialized processing block 300 involve calculating the value of a final exponent, or determining special or error conditions based on the overflow condition.

Consider the scenario in which specialized processing block 300 handles 32-bit wide signals, such as single precision floating-point numbers as defined by standard IEEE754. The handling of 32-bit signals with specialized processing block 300 is merely illustrative and is not intended to limit the scope of the present embodiments. If desired, specialized processing block 300 may handle any bit width. For example, specialized processing block 300 may handle double precision floating-point numbers (i.e., 64-bit wide signals), quadruple precision floating-point numbers (i.e., 128-bit wide signals), half precision floating-point numbers (i.e., 16-bit wide signals), to name a few.

Accordingly, the number of registers and multiplexers in specialized processing block 300 may be adapted to the bit width of the incoming signals. For example, in the scenario that all input signals are 32-bit wide, each register (i.e., registers 331-339) actually includes 32 or more (e.g., register 339 may have more bits if used together with adder and subtractor stage 320 to implement an accumulator) 1-bit registers. Similarly, multiplexer 347 may include 32 two-to-one multiplexers, multiplexers 343 and 345 may include 32 three-to-one multiplexers, and multiplexer 341 may include 32 four-to-one multiplexers.

For example, each of the 32 two-to-one multiplexers that constitute multiplexer 347 may receive one bit of the signal from register 337 and one bit of the signal from register 339. All 32 two-to-one multiplexers of multiplexer 347 may share the same control signal such that either all signals received from register 337 are selected or all signals received from register 339 are selected.

Some elements of specialized processing block 300 may be optionally bypassable. For example, a bypass path may be provided that bypasses multiplier stage 310 (e.g., via register 333) and/or adder and subtractor stage 320 (not shown). Optionally bypassable pipelining (not shown) may also be provided within either or both of the multiplier stage 310 and the adder and subtractor stage 320. Registers 331-339 in specialized processing block 300 may also be optionally bypassed (not shown). A bypass path (not shown) that connects the output of the multiplier stage 310 to output 361 may be provided to enable multiplication operations that don't require additions or subtractions.

Specialized processing block 300 may have multiplexers 345 to select among inputs. Multiplexer 347 may be provided to select between the output of multiplexer 345 and the output of adder and subtractor stage 320. Multiplexer 343 may be provided to select between two inputs and the output of multiplier stage 310. Multiplier 341 may select between the output of multiplier stage 310, an input, and the outputs of adder and subtractor stage 320.

Signals may be routed to the input ports of adder and subtractor stage 320 from multiple sources. For example, signals may be routed to adder and subtractor stage 320 from the output of multiplier stage 310 or from an input of specialized processing block 300 through multiplexer 343. If desired, signals may be routed to adder and subtractor stage 320 from input 351 and multiplexer 345 from a first adjacent similar specialized processing block 300 via a first direct connection, or through input 352 and multiplexer 345 from a second adjacent similar specialized processing block via a second direct connection.

Specialized processing block 300 may be configured in various different ways to implement a wide variety of functions. For example, specialized processing block 300 may be configured to implement a multiplier, a multiply-add function, a multiply-accumulate function, an add function, a subtract function, a combined add and subtract function, just to name a few.

Figure 4:
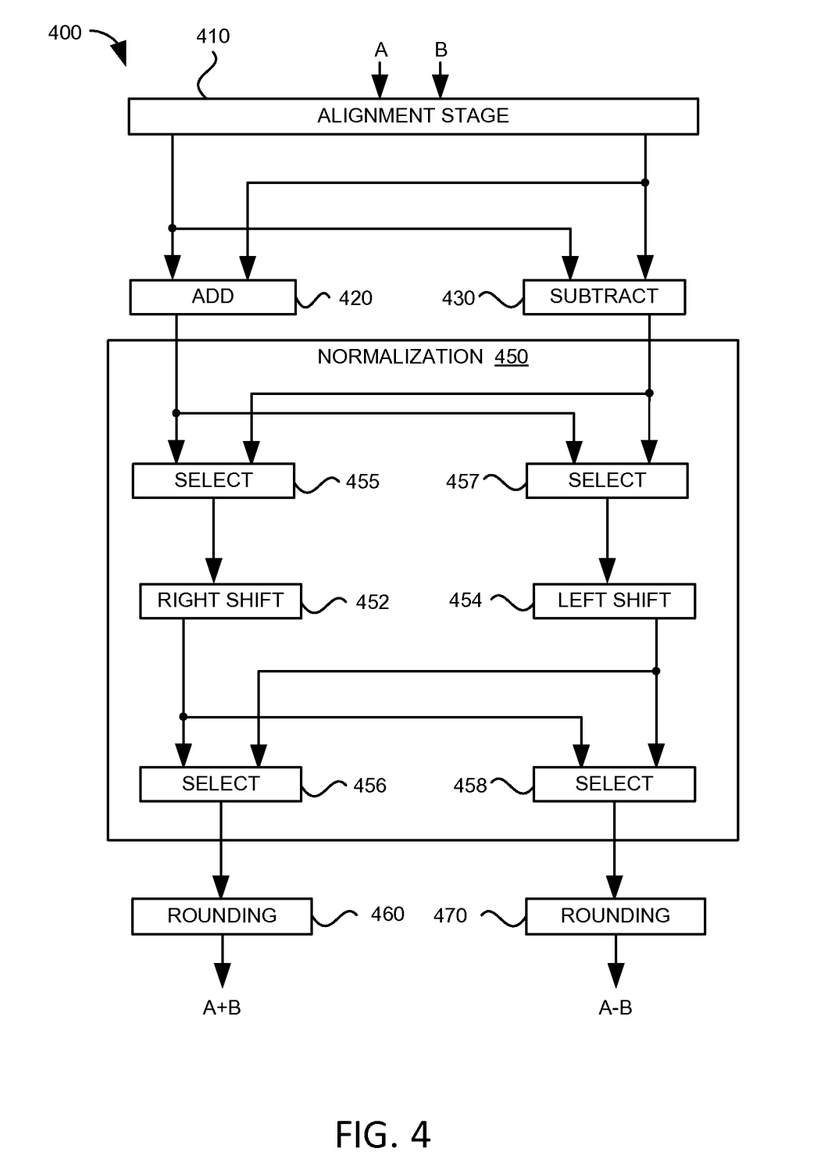
FIG. 4 is a diagram of an illustrative fused floating-point adder-subtractor in accordance with an embodiment.

If desired, adder and subtractor stage 320 may implement a fused floating-point adder-subtractor. A fused floating-point adder-subtractor may be defined as an arithmetic operator circuit that performs add and subtract operations of floating-point numbers and that includes circuitry that is used for both the add and the subtract operation. An example of a fused floating-point adder-subtractor is fused floating-point adder-subtractor 400 of FIG. 4. As shown in FIG. 4, fused floating-point adder-subtractor 400 may include alignment stage 410, adder 420, subtractor 430, rounding blocks 460 and 470, and normalization stage 450, which may include right shifter 452, left shifter 454, and selector blocks 455, 456, 457, and 458.

As shown, alignment stage 410 may receive floating-point numbers A and B, which both may have a sign, an exponent, and a mantissa. If desired, alignment stage 410 may perform alignment of floating-point numbers A and B. In some embodiments, alignment stage 410 may determine which of floating-point numbers A and B has the smaller exponent. Consider for example that A has an exponent that is greater than the exponent of B. In this example, alignment stage 410 may right shift the mantissa of B by a predetermined number of positions which is determined by the difference between the exponent of A and the exponent of B. For example, consider the scenario in which the exponent of A is N and the exponent of B is N minus M with N and M both being positive integers. In this scenario, alignment stage 410 may right shift the mantissa of B by M positions to the right, thereby aligning the floating-point numbers A and B.

Alignment stage 410 may provide the aligned floating-point numbers A and B to adder 420 and subtractor 430, which may perform a floating-point addition and a floating-point subtraction, respectively. For example, adder 420 may add the aligned mantissas of A and B to produce a sum, while subtractor 430 may subtract the mantissa of B from the mantissa of A to produce a difference. In the event that the sum and/or the difference is not in compliance with a standard such as the IEEE754 standard, normalization stage 450 may normalize the sum and/or the difference, respectively.

Normalization may require a left shift operation if two numbers are effectively subtracted from each other (e.g., adding two numbers with different signs or subtracting a number from another that has the same sign) and a right shift operation if two numbers are effectively added together (e.g., adding two numbers with the same sign or subtracting a number from another that has a different sign). However, shifting right and shifting left may never occur at the same time for either add or subtract operation.

Thus, selector blocks 455 and 457 may select the output from adder 420 and subtractor 430 for right shifting using right shifter 452 and for left shifting using left shifter 454, respectively, if the floating-point numbers A and B have the same sign (i.e., adder 420 executes as effective operation an addition, and subtractor 430 executes as effective operation a subtraction). Alternatively, selector blocks 455 and 457 may select the output from subtractor 430 and adder 420 for right shifting using right shifter 452 and for left shifting using left shifter 454, respectively, if the floating-point numbers A and B have different signs (i.e., adder 420 executes as effective operation a subtraction, and subtractor 430 executes as effective operation an addition).

Normalization stage 450 may determine the position of a first "1" in the overflow bits if the effective operation is an addition. Thus, normalization stage 450 may identify the implied leading "1" to determine a number of shift operations. The mantissa received from selector 455 is then right-shifted in right shifter 452 by that number to obtain a leading "1".

In case of a subtraction, the mantissa may have a number of leading zeroes instead of leading "1" position. Normalization stage 450 may determine the number of leading zeroes in the mantissa. The mantissa is then left-shifted by left shifter 454 by that number to obtain a leading "1", which is then eliminated because the leading "1" is implied by the IEEE754 standard.

Similar to selector blocks 455 and 457, selector blocks 456 and 458 may select the output from right shifter 452 and from left shifter 454, respectively, if the floating-point numbers A and B have the same sign. Alternatively, selector blocks 456 and 458 may select the output from left shifter 454 and from right shifter 452, respectively, if the floating-point numbers A and B have different signs.

The output of selectors 456 and 458 in normalization stage 450 may be rounded using rounding blocks 460 and 470, respectively. Thus, rounding block 460 may provide the sum of floating-point numbers A and B (i.e., A+B), while rounding block 470 provides the difference between floating-point numbers A and B (i.e., A-B).

Rounding in blocks 460 and 470 may use different rounding schemes. For example, rounding schemes such as round up, round down, round toward zero (which is sometimes also referred to as truncation) or round to the nearest value, where the nearest value may be an integer, an even value, an odd value, or a representable value. Rounding to the nearest value may lead to a tie. In this case, a second round to the nearest value method may be used as a tie breaker. For example, a round to the nearest integer method may be combined with a round to the nearest even method as a tie breaker.

Figure 5:
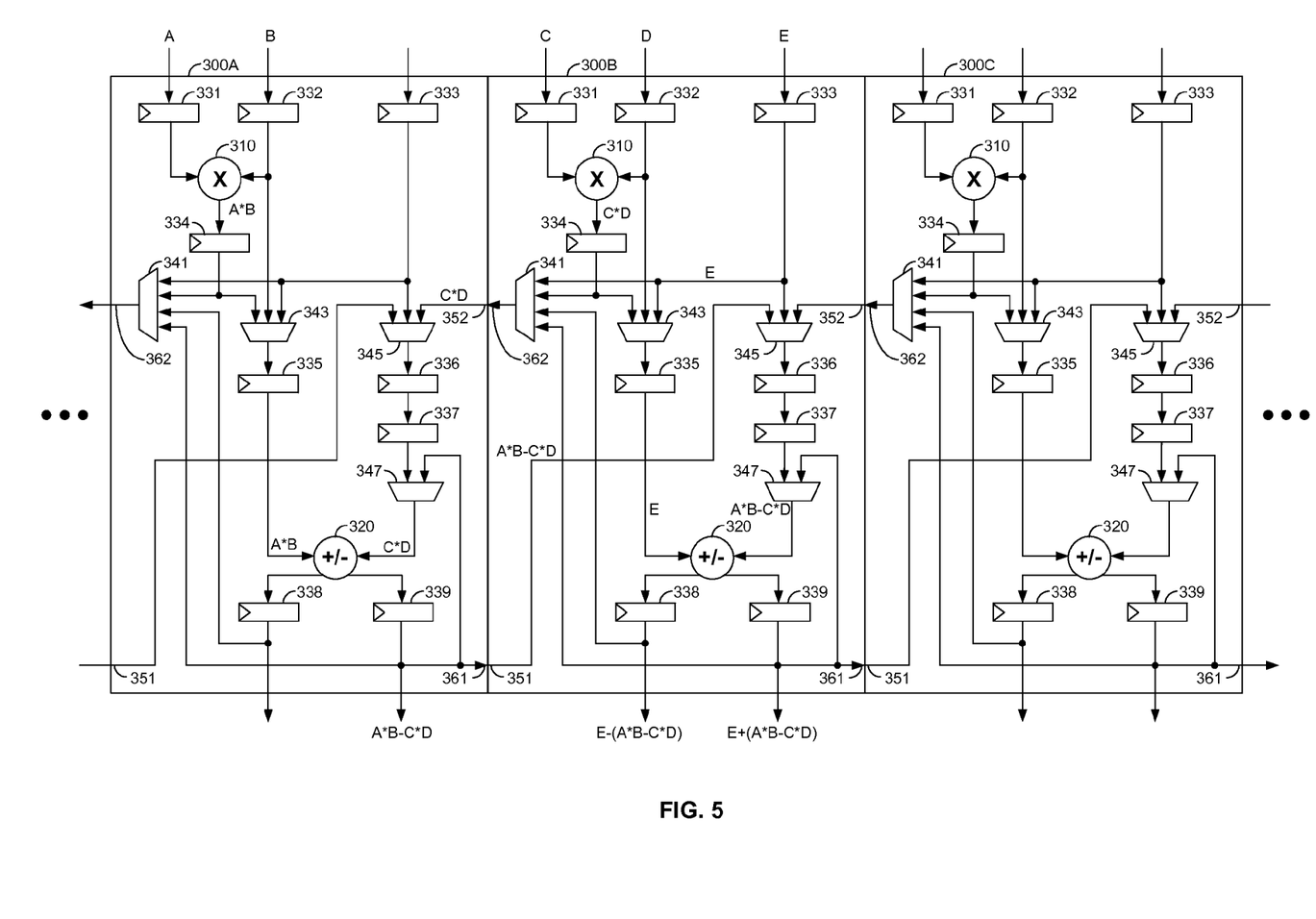
FIG. 5 is a diagram of an illustrative integrated circuit with multiple specialized processing blocks that are directly coupled to one another in accordance with an embodiment.

Multiple specialized processing blocks according to embodiments of the invention may be arranged in a row or column, so that information can be fed from one specialized processing block to the next using the aforementioned direct connections between output 361 and input 351 and between output 362 and input 352 of adjacent specialized processing blocks, respectively, to create more complex structures. FIG. 5 shows a number of exemplary series-connected specialized processing blocks 300A, 300B, and 300C according to an embodiment.

As shown in FIG. 5, output 362 and input 351 of specialized processing block 300B are directly coupled to input 352 and output 361 of specialized processing block 300A, respectively, while input 352 and output 361 of specialized processing block 300B are directly coupled to output 362 and input 351 of specialized processing block 300C, respectively. As an example, consider that specialized processing block 300A receives input signals A and B, that specialized processing block 300B receives input signals C, D, and E and that specialized processing blocks 300A and 300B together implement the functions E−(A*B−C*D) and E+(A*B−C*D).

Implementing the functions:

$$F1 = E - (A*B - C*D) \tag{1}$$

$$F2 = E + (A*B - C*D) \tag{2}$$

may be important for many applications including the implementation of a Fast Fourier Transform (FFT), where addition and subtraction of a pair of numbers occurs frequently. As an example, the butterfly structure of an eight-point Fast Fourier Transform (FFT) circuit structure implements the functions $$f1 = x[0] + x[4] * W4\_0 \tag{3}$$

$$f2 = x[0] - x[4] * W4\_0 \tag{4}$$

where x[0], x[4], and W4_0 are complex numbers with a real part (e.g., re(x[0]), re(x[4]), and re(W4_0)) and an imaginary part (e.g., im(x[0]), im(x[4]), and im(W4_0)).

In other words, x[0]=re(x[0])+j*im(x[0]), x[4]=re(x[4])+j*im(x[4]), W4_0=re(W4_0)+j*im(W4_0), and j*j=−1. Thus, the real part of f1 (re(f1)) and f2 (re(f2)) may be computed as $$re(f1) = re(x[0]) + (re(x[4]) * re(W4\_0) - im(x[4]) * im(W4\_0)) \tag{5}$$

$$re(f2) = re(x[0]) - (re(x[4]) * re(W4\_0) - im(x[4]) * im(W4\_0)) \tag{6}$$

Thus, equations (5) and (6) have the same form as equations (1) and (2) with F1=re(f1), E=re(x[0]), A=re(x[4]), B=re(W4_0), C=im(x[4]), and D=im(W4_0).

As shown in FIG. 5, specialized processing block 300A may receive signals A and B and specialized processing block 300B may receive signals C, D, and E. Signals A, B, C, and D may be routed through registers 331 and 332 to multiplier stages 310 of the respective specialized processing blocks. Multiplier stage 310 of specialized processing block 300A may compute product A*B, while multiplier stage 310 of specialized processing block 300B computes product C*D.

Product A*B may be routed from multiplier stage 310 of specialized processing block 300A through register 334, multiplexer 343, and register 335 to adder and subtractor stage 320 of specialized processing block 300A. Product C*D may be routed from multiplier stage 310 of specialized processing block 300B through register 334, multiplexer 341, output 362, and a direct connection between specialized processing blocks 300B and 300A to input 352 of specialized processing block 300A and from there through multiplexer 345, registers 336 and 337, and multiplexer 347 to adder and subtractor stage 320 of specialized processing block 300A.

Adder and subtractor stage 320 of specialized processing block 300A may subtract C*D from A*B, thereby producing the difference A*B−C*D, which may be routed through register 339 to output 361 of specialized processing block 300A and from there through another direct connection between specialized processing blocks 300A and 300B to input 351 of specialized processing block 300B. The difference may then be routed from input 351 through multiplexer 345, registers 336 and 337, and multiplexer 347 to adder and subtractor stage 320 of specialized processing block 300B.

Signal E may be routed from the input of specialized processing block 300B through register 333, multiplexer 343, and register 335 to adder and subtractor stage 320 of specialized processing block 300B. Adder and subtractor stage 320 of specialized processing block 300B may perform an addition and a subtraction, thereby computing F1 and F2 as described in equations (1) and (2) and providing F1 and F2 at the outputs of specialized processing block 300B.

Figure 6:
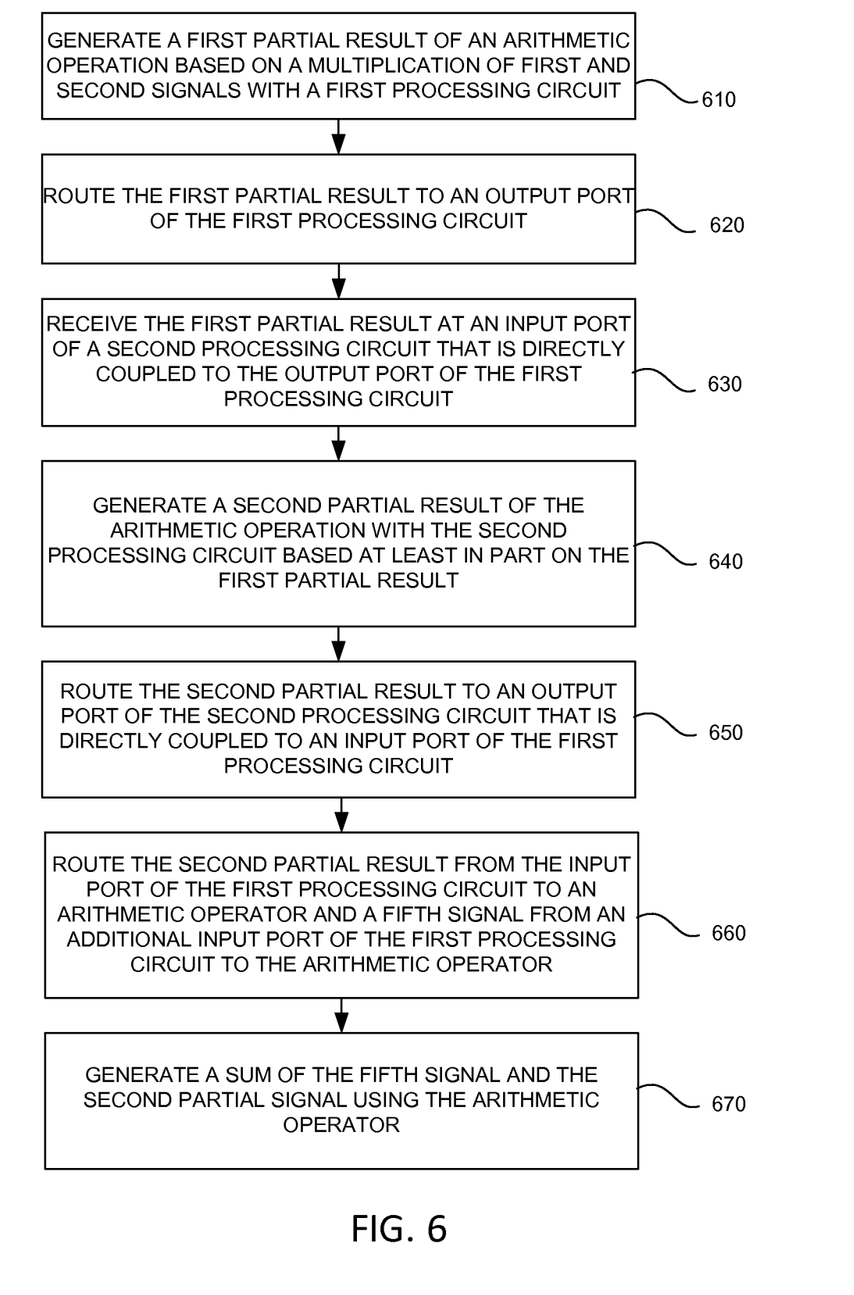
FIG. 6 is a flow chart of illustrative steps for using first and second processing circuits having the same architecture to perform an arithmetic operation in accordance with an embodiment.

Illustrative steps for using first and second processing circuits that have a same architecture to perform an arithmetic operation are shown in the flow chart of FIG. 6. During step 610, a floating-point arithmetic operator may generate a first partial result of an arithmetic operation based on a multiplication of first and second signals with a first processing circuit. For example, as shown in FIG. 5, multiplier stage 310 may generate the product of signals C and D in specialized processing block 300B.

During step 620, the first processing circuit may route the first partial result to an output port of the first processing circuit. For example, multiplexer 341 of specialized processing block 300B of FIG. 5 may be configured to select the output of register 334. Thereby, specialized processing block 300B may route the product C*D from multiplier stage 310 through register 334 and multiplexer 341 to output 362.

During step 630, a second processing circuit may receive the first partial result at an input port that is directly coupled to the output port of the first processing block. For example, specialized processing block 300A of FIG. 5 may receive the product C*D at input 352, which is directly coupled to output 362 of specialized processing block 300B.

During step 640, the second processing circuit may generate a second partial result of the arithmetic operation based at least in part on the first partial result. For example, multiplier stage 310 of specialized processing block 300A of FIG. 5 may compute a product of signals A and B and route the product A*B to adder and subtractor stage 320 of specialized processing block 300A. Adder and subtractor stage 320 may subtract the product C*D from the product A*B, thereby generating the difference A*B−C*D.

During step 650, the second processing circuit may route the second partial result to an output port that is directly coupled to an input port of the first processing circuit. For example, specialized processing block 300A of FIG. 5 may route the difference A*B−C*D from adder and subtractor stage 320 through register 339 to output 361 of specialized processing block 300A, which is directly coupled to input 351 of specialized processing block 300B.

During step 660, the first processing circuit may route the second partial result from the input port of the first processing circuit to an arithmetic operator and a fifth signal from an additional input port of the first processing circuit to the arithmetic operator.

During step 670, the arithmetic operator in the first processing circuit may generate a sum of the fifth signal and the second partial signal using the arithmetic operator.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. An integrated circuit, comprising:
   first and second specialized processing blocks, wherein the first specialized processing block comprises:
      a first input that is directly coupled to an output of the second specialized processing block;
      a first output that is directly coupled to an input of the second specialized processing block;
      a first arithmetic operator stage; and
      a second arithmetic operator stage that is coupled to the first arithmetic operator stage, the first input, and the first output.

2. The integrated circuit of claim 1, wherein the second arithmetic operator stage has first and second output ports, and wherein the first specialized processing block further comprises:
   a multiplexer with first, second, and third input ports and an output port, wherein the first and second input ports of the multiplexer are coupled to the first and second output ports of the second arithmetic operator stage, wherein the third input port of the multiplexer is coupled to the first arithmetic operator stage, and wherein the output port of the multiplexer is coupled to the first output of the first specialized processing block.

3. The integrated circuit of claim 1, wherein the first specialized processing block further comprises:
   a second input that is directly coupled to an output of a third specialized processing block that is different than the second specialized processing block.

4. The integrated circuit of claim 3, wherein the first specialized processing block further comprises:

a multiplexer with an output port and first and second input ports, wherein the output port of the multiplexer is coupled to the second arithmetic operator stage, and wherein the first and second input ports of the multiplexer are coupled to the first and second inputs of the first specialized processing block, respectively.

5. The integrated circuit of claim 1, wherein the second arithmetic operator stage further comprises:
a floating-point adder-subtractor circuit that receives first and second floating-point numbers each having an exponent and a mantissa, wherein the floating-point adder-subtractor computes the sum of the first and second floating-point numbers and the difference between the first and the second floating-point numbers.

6. The integrated circuit of claim 5, wherein the floating-point adder-subtractor circuit comprises:
an alignment block that receives the first and second floating-point numbers and produces aligned first and second floating-point numbers having aligned mantissas and aligned exponents.

7. The integrated circuit of claim 6, wherein the alignment block further comprises:
a shifter circuit that receives the first and second floating-point numbers with the mantissas and the exponents and right-shifts one of the mantissas based on the exponents of the received floating-point numbers.

8. The integrated circuit of claim 6, wherein the floating-point adder-subtractor circuit further comprises:
an adder circuit that is coupled to the alignment block and that produces a sum of the aligned mantissas of the aligned first and second floating-point numbers; and
a right shift circuit that receives the sum of the aligned mantissas and converts the sum in accordance with a standard requiring an implied leading bit.

9. The integrated circuit of claim 6, wherein the floating-point adder-subtractor circuit further comprises:
a subtractor circuit that is coupled to the alignment block and that produces the difference of the aligned mantissas of the aligned first and second floating-point numbers; and
a left shift circuit that receives the difference of the aligned mantissas and converts the sum in accordance with a standard requiring an implied leading bit.

10. Circuitry that performs floating-point operations, comprising:
a first arithmetic processing circuit having a first input and a first output; and
a second arithmetic processing circuit having a second input, a second output, an arithmetic operator, and a dedicated routing path that couples the arithmetic operator to the second output, wherein the second input is directly coupled to the first output of the first arithmetic processing circuit, wherein the second output is directly coupled to the first input of the first arithmetic processing circuit, and wherein the arithmetic operator receives an input signal from the second input, performs an arithmetic operation based on the input signal to produce a corresponding output signal that is routed via the dedicated routing path to the second output.

11. The circuitry of claim 10, wherein the arithmetic operator implements a fused floating-point addition and subtraction, and wherein at least an alignment operation is shared between a floating-point addition operation and a floating-point subtraction operation.

12. The circuitry of claim 11, wherein the input signal has a first mantissa and a first exponent, and wherein the arithmetic operator further comprises:
an alignment stage that receives the input signal and an additional input signal, wherein the additional input signal has a second mantissa and a second exponent, and wherein the alignment stage produces aligned signals by shifting at least one of the first and second mantissas such that the first and second exponents are equal.

13. The circuitry of claim 12, wherein the arithmetic operator further comprises:
an adder that produces a sum of the aligned signals; and
a subtractor that produces the difference of the aligned signals.

14. The circuitry of claim 13, wherein the arithmetic operator further comprises:
a normalization stage that converts the sum and the difference of the aligned signals in accordance with a standard requiring an implied leading bit.

15. The circuitry of claim 10, wherein the first arithmetic processing circuit further comprises:
an additional arithmetic operator that is different than the arithmetic operator in the second arithmetic processing circuit, wherein the additional arithmetic operator receives first and second signals and produces a product of the first and second signals, and wherein the first arithmetic processing circuit further comprises a multiplexer coupled between the additional arithmetic operator and the first output of the first arithmetic processing circuit, wherein the multiplexer receives the product of the first and second signals and routes the product of the first and second signals to the first output of the first arithmetic processing circuit.

16. A method for operating first and second processing circuits having the same architecture to perform an arithmetic operation, the method comprising:
generating a first partial result of the arithmetic operation based on a multiplication of first and second signals with the first processing circuit;
routing the first partial result to an output port of the first processing circuit;
receiving the first partial result at an input port of the second processing circuit that is directly coupled to the output port of the first processing circuit;
generating a second partial result of the arithmetic operation with the second processing circuit based at least in part on the first partial result; and
routing the second partial result to an output port of the second processing circuit that is directly coupled to an input port of the first processing circuit.

17. The method of claim 16, wherein generating the second partial result further comprises:
generating a third partial result of the arithmetic operation based on a multiplication of third and fourth signals with the second processing circuit; and
generating a difference between the third partial result and the first partial result to produce the second partial result.

18. The method of claim 17, further comprising:
pipelining the first and third partial results before generating the difference by storing the first and third partial results in respective first and second registers.

19. The method of claim 16, further comprising:
routing the second partial result from the input port of the first processing circuit to an arithmetic operator.

20. The method of claim 19, further comprising:
routing a fifth signal from an additional input port of the first processing circuit to the arithmetic operator;
generating a sum of the fifth signal and the second partial signal using the arithmetic operator, wherein the arithmetic operator implements a fused floating-point adder-subtractor; and
generating a difference between the fifth signal and the second partial signal using the fused floating-point adder-subtractor.

* * * * *